United States Patent
Terada

[11] Patent Number: 5,911,294
[45] Date of Patent: *Jun. 15, 1999

[54] CLUTCH COVER ASSEMBLY HAVING A TAB MEMBERS FORMED ON THE CLUTCH COVER TO SUPPORT A DIAPHRAGM SPRING

[75] Inventor: Naohiro Terada, Takarazuka, Japan

[73] Assignee: Exedy Corporation, Neyagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/813,993

[22] Filed: Mar. 6, 1997

[30] Foreign Application Priority Data

Mar. 14, 1996 [JP] Japan ................................. 8-057071

[51] Int. Cl.⁶ .................................................. F16D 13/50
[52] U.S. Cl. ..................................... 192/70.27; 192/89.23
[58] Field of Search ............................ 192/89.23, 89.25, 192/113.24, 113.2, 70.27, 89.22

[56] References Cited

U.S. PATENT DOCUMENTS

| | | | |
|---|---|---|---|
| 3,213,991 | 10/1965 | Smirl et al. ............................... | 192/112 |
| 4,365,697 | 12/1982 | Honemann ............................ | 192/89.23 |
| 4,781,280 | 11/1988 | Huber ............................... | 192/89.23 X |
| 4,828,092 | 5/1989 | Kohler ................................. | 192/89.23 |
| 5,509,519 | 4/1996 | De Briel .......................... | 192/89.23 X |
| 5,641,047 | 6/1997 | Dequesnes et al. ........... | 192/113.24 X |

FOREIGN PATENT DOCUMENTS

| | | |
|---|---|---|
| 0049058 | 4/1982 | European Pat. Off. . |
| 2417677 | 9/1979 | France . |
| 2564545 | 11/1985 | France ................................. 192/89.23 |
| 2015091 | 9/1979 | United Kingdom . |
| 2230572 | 10/1990 | United Kingdom . |

*Primary Examiner*—Rodney H. Bonck
*Attorney, Agent, or Firm*—Shinjyu An Intellectual Property Firm

[57] ABSTRACT

A clutch cover (2) is fixed to a flywheel (50) at an outer peripheral portion thereof and includes a plurality of first embossed portions (11) which are formed on the inner peripheral portion of the clutch cover (2) through press working so as to protrude toward a flywheel side thereof, and a plurality of tabs (10) which are bent toward the flywheel side from the vicinity of the first embossed portions 11 and further bent radially outward. A diaphragm spring (4) includes an annular resilient portion (4a) which is compressed between the pressure plate (3) and the first embossed portions (11) in a state where an outer peripheral portion thereof abuts against the pressure plate (3) and an inner peripheral portion thereof abuts against the first embossed portions (11), and a plurality of lever portions that extend radially inwardly from the annular resilient portion (4a). A wire ring (5) is supported by the tabs (10) and abuts against the flywheel (50) side of the inner peripheral portion of the annular resilient portion (4a).

7 Claims, 5 Drawing Sheets

Fig. 3
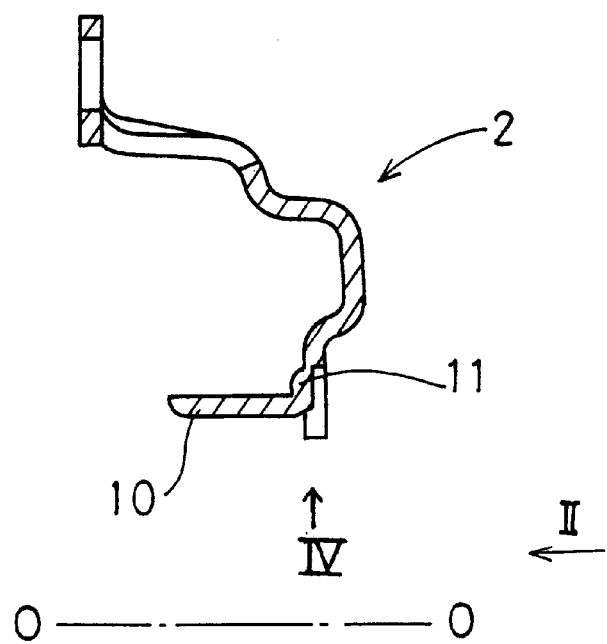
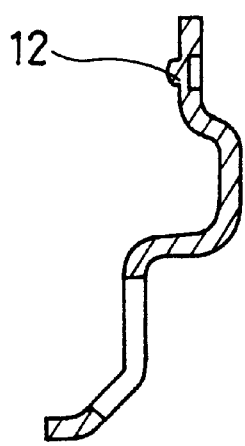

CLUTCH COVER ASSEMBLY HAVING A TAB MEMBERS FORMED ON THE CLUTCH COVER TO SUPPORT A DIAPHRAGM SPRING

BACKGROUND OF THE INVENTION

1. Field of the Invention

The present invention relates to a clutch cover assembly, more particularly to a clutch cover assembly having a clutch cover with integrally formed support portions for supporting a diaphragm spring.

2. Description of the Related Art

A clutch cover assembly is attached to an engine side flywheel for engaging and dis-engaging a clutch. The clutch cover assembly is mainly made up of a clutch cover, a pressure plate and a diaphragm spring.

The clutch cover is formed of a substantially disc-shaped plate member with a large-diameter center hole in the center thereof. The clutch cover is fixed to the flywheel at an outer peripheral portion thereof by bolts. The pressure plate is formed of an annular member disposed within the clutch cover and has a pressing surface which faces a frictional facing of a clutch disc.

The diaphragm spring is made up of an annular resilient portion and a plurality of lever portions that extend radially inwardly from the resilient portion. In the push type clutch cover assembly, the outer peripheral portion of the resilient portion of the diaphragm spring abuts against the pressure plate, and the inner peripheral portion thereof is supported by the clutch cover. A known mechanism for supporting the inner peripheral side of the annular resilient portion is made up of, for example, a plurality of stud pins disposed circumferentially and two wire rings which are supported by these stud pins and abut against both surface, of the resilient portion. Also, there is known a mechanism in which the stud pins are replaced by a plurality of bent tabs that extend integrally toward the inner peripheral portion of the clutch cover, and these tabs penetrate an oblong hole of the diaphragm spring and are then bent so as to support two wire rings.

Further, there is known a mechanism in which no wire ring disposed between the resilient portion of the diaphragm spring and the clutch cover is used. In this mechanism, the wire ring is replaced by a protrusion formed through press working which supports the resilient portion. The omission of one wire ring allows the number of parts as used to be reduced and the assembling workability to be improved.

In the conventional clutch cover assembly from which one wire ring is omitted, the hardness of the protrusion formed through the press working is insufficient and liable to be worn.

SUMMARY OF THE INVENTION

One object of the present invention is to reduce the number of parts necessary to support a diaphragm spring within a clutch cover, and improve the strength and wear resistance of the portion of clutch cover that contacts the diaphragm spring.

In accordance with one aspect of the present invention, a clutch cover assembly includes a clutch cover having a radially outer portion configured for attachment to a flywheel, the clutch cover formed proximate an inner radial portion with a plurality of first support portions that are formed at circumferentially spaced apart positions on the clutch cover by press working so as to protrude toward a flywheel side of the clutch cover, the clutch cover formed with a plurality of tabs which extend toward the flywheel side from adjacent to the first support portions.

Preferably, the clutch cover assembly also includes a plurality of second support portions formed on the inner radial portion of the clutch cover between the first support portions, the second support portions formed so as to protrude toward the flywheel side by press working.

In accordance with another aspect of the present invention, a clutch cover assembly includes a clutch cover having a radially outer portion configured for attachment to a flywheel, the clutch cover formed proximate an inner radial portion with a plurality of first support portions that are formed at circumferentially spaced apart positions on the clutch cover by press working so as to protrude toward a flywheel side of the clutch cover, the clutch cover formed with a plurality of tabs which extend toward the flywheel side from adjacent to the first support portions, the tabs configured to engage and support a diaphragm spring and a wire ring, the first support portions and the wire ring serving as fulcrums for the diaphragm spring.

Preferably, the clutch cover assembly also includes a plurality of second support portions formed on the inner radial portion of the clutch cover between the first support portions, the second support portions formed so as to protrude toward the flywheel side by press working, the second support portions being configured to engage the diaphragm spring and serve as a fulcrum.

In accordance with yet another aspect of the present invention, a clutch cover assembly includes a clutch cover having a radially outer portion configured for attachment to a flywheel, the clutch cover formed proximate an inner radial portion with a plurality of first support portions that are formed at circumferentially spaced apart positions on the clutch cover by press working so as to protrude toward a flywheel side of the clutch cover, the clutch cover formed with a plurality of tabs which extend toward the flywheel side from adjacent to the first support portions, the tabs configured to engage and support a diaphragm spring and a wire ring, the first support portions and the wire ring serving as fulcrums for the diaphragm spring.

Preferably, the clutch cover assembly also includes a plurality of second support portions formed on the inner radial portion of the clutch cover between the first support portions, the second support portions formed so as to protrude toward the flywheel side by press working, the second support portions being configured to engage the diaphragm spring and serve as a fulcrum.

Preferably, the clutch cover assembly includes a pressure plate disposed within the clutch cover having a friction face facing the flywheel.

Preferably, the diaphragm spring includes an annular resilient portion engaged between the pressure plate and the first support portions where an outer peripheral portion thereof abuts against the pressure plate and an inner peripheral portion thereof abuts against the first support portions, the diaphragm spring further formed with a plurality of lever portions that extend radially inwardly from the annular resilient portion.

Preferably, a distal portion of each of the tabs further extends radially outward confining the wire ring and the diaphragm spring against axial movement between the distal portions of the tabs and the first support portions.

Preferably, the clutch cover assembly further includes a plurality of second support portions formed on the inner radial portion of the clutch cover between the first support portions, the second support portions formed so as to protrude toward the flywheel side by press working, the second support portions being configured to engage the diaphragm spring and serve as a fulcrum.

In the clutch cover assembly of the present invention only one wire ring is employed, whereas prior art configurations typically require two wire rings. One wire ring is omitted in the present invention and instead first support portions are formed on the clutch cover so as to abut against the inner peripheral portion of the annular resilient portion of the diaphragm spring. Also, because the plurality of tabs are bent in the vicinity of the first support portions, the hardness of the first support portions is increased by work hardening.

Further, the second support portions formed on the clutch cover also abut against the inner peripheral portion of the annular resilient portion. The diaphragm spring is thus supported by the first and second support portions with the result that the surface pressure on each support portion is lowered to reduce possible wear. Further, a gap is defined circumferentially between the respective first and second support portions, thereby being capable of exhausting, for example, of debris such as worn powders from a clutch disc.

The above and other objects and features of the present invention will be more apparent from the following description taken in conjunction with the accompanying drawings.

BRIEF DESCRIPTION OF THE DRAWINGS

In the drawings,

FIG. 3 is a side cross-sectional view similar to FIG. 1, showing only the clutch cover of the clutch cover assembly depicted in FIG. 1;

DETAILED DESCRIPTION OF THE PREFERRED EMBODIMENTS

Now, a description will be given in more detail of preferred embodiment of the present invention with reference to the accompanying drawings where like numbers represent like components throughout the specification and drawings.

Figure 1:
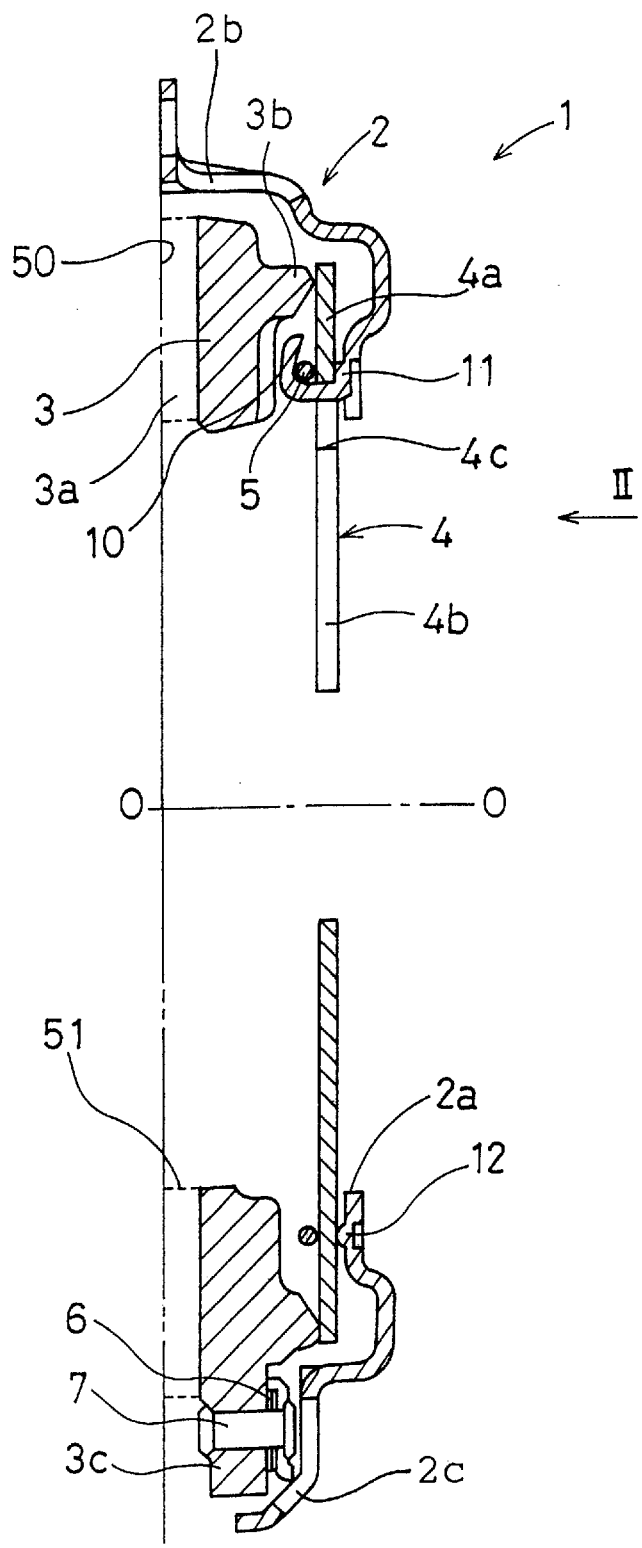
FIG. 1 is a side cross-sectional schematic view showing a clutch cover assembly in accordance with one embodiment of the present invention.
Figure 2:
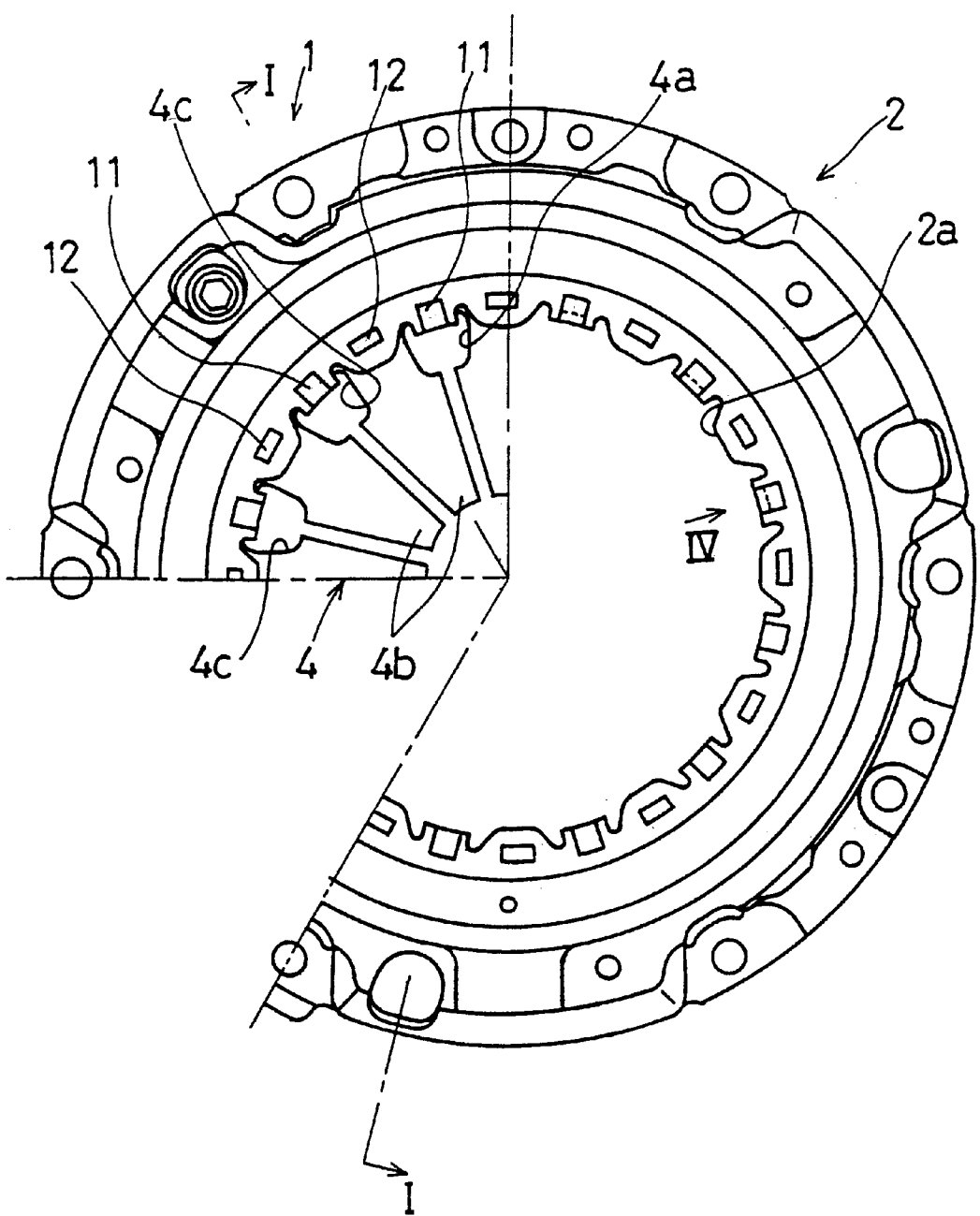
FIG. 2 is a fragmentary, part cutaway, part elevational view showing the clutch cover assembly depicted in FIG. 1.

A push type clutch cover assembly 1 shown in FIGS. 1 and 2 is so designed as to control engagement and disengagement of a frictional coupling portion 51 of a clutch disc (not entirely shown) with a flywheel 50. The clutch cover assembly 1 is mainly made up of a clutch cover 2, a pressure plate 3 and a diaphragm spring 4. In FIG. 1, the line 0—0 represents a center line of the clutch cover assembly 1, about which the clutch cover assembly 1 may rotate. Further, the left side of FIG. 1 will hereinafter be referred to as the flywheel side and the engine side. The right side of FIG. 1 will hereinafter be referred to as the transmission side.

The clutch cover 2 is formed of a substantially disk-shaped plate member and is fixed to the flywheel 50 at an outer peripheral portion thereof, for example, by bolts. A large-diameter center hole 2a is defined in the center of the clutch cover 2. The pressure plate 3 is formed of an annular member having a pressing surface 3a formed on a side facing the flywheel 50. A frictional coupling portion 51 of the clutch disc assembly (not completely shown) is disposed between the pressing surface 3a and the flywheel 50. An annular protrusion 3b is formed in the pressure plate 3 that protrudes axially on the side opposite the pressing surface 3a. It should be noted that the pressure plate 3 includes several protrusions 3c that extend radially outwardly at a plurality of circumferential positions. One end of a strap plate 6 is fixed to each protrusion 3c by a rivet 7. The strap plate 6 extends tangentially from the pressure plate 3. The other end of the strap plate 6 is fixed to the clutch cover 2. As a result, the pressure plate 3 is not rotatable with respect to the clutch cover 2 but is axially movable with respect to the clutch cover 2. It should be noted that the urging force of the strap plate 6 causes the pressure plate 3 to be biased in a direction away from the flywheel 50.

The diaphragm spring 4 is formed of a disc-shaped member which is disposed between the pressure plate 3 and the inner surface of the clutch cover 2. The diaphragm spring 4 is made up of an annular resilient portion 4a and a plurality of lever portions 4b that extend radially inwardly from the inner peripheral portion of the annular resilient portion 4a. The outer peripheral portion of the annular resilient portion 4a abuts against the annular protrusion 3b of the pressure plate 3. The inner peripheral portion of the annular resilient portion 4a is supported by the clutch cover 2 (as described below). In this state, the annular resilient portion 4a urges the pressure plate 3 toward the flywheel 50. A plurality of slits are defined between the respective lever portions 4b of the diaphragm spring 4, and oblong holes 4c are formed at the end of each slit at a radial mid-portion of the diaphragm spring 4.

On a radial inner peripheral portion of the clutch cover 2, tabs 10 are formed at a positions corresponding to each oblong hole 4c. Each tab 10 is bent from the periphery of the center hole 2a toward the flywheel 50 so as to extend through the oblong hole 4c of the diaphragm spring 4, and is further bent to extend radially outwardly on the opposite side of the diaphragm spring 4, as is shown in FIG. 1. A first embossed portion 11 is formed on the base portion of each tab 10 so as to protrude toward the flywheel 50. The first embossed portion 11 supports a transmission side surface of the inner peripheral portion of the annular resilient portion 4a. A wire ring 5 is disposed between the tip portion of the tab 10 and the inner peripheral portion of the annular resilient portion 4a. The wire ring 5 supports an engine side surface of the inner peripheral portion of the annular resilient portion 4a.

The first embossed portions 11, as is apparent from FIG. 2, are formed so as to provide circumferential spaces or gaps on either side of each tab 10. Further, the base portion of each tab 10 on each side of each tab 10 is generally thick circumferentially on each side thereof so as to provide sufficient strength to the clutch cover 2.

Second embossed portions 12 are formed on the clutch cover 2 circumferentially between each tab 10. The second embossed portions 12 protrude toward the flywheel 50 side and abuts against the inner peripheral portion of the annular resilient portion 4a. The second embossed portions 12 are radially shorter but circumferentially longer than the first embossed portions 11.

Figure 4:
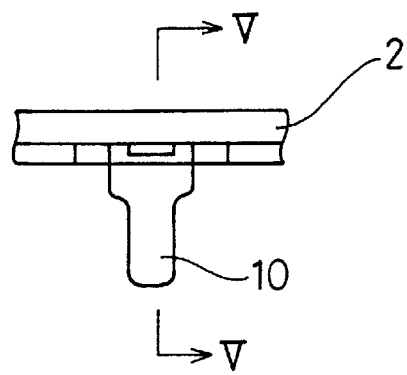
FIG. 4 is a fragmentary, end elevational view of a portion of the clutch cover shown in FIG. 3, looking in the direction of the arrow IV in FIG. 3.
Figure 5:
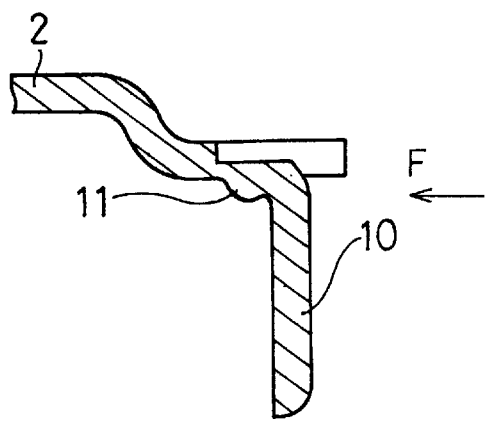
FIG. 5 is a fragmentary cross-sectional view of a portion of the clutch cover depicted in FIGS. 3 and 4, showing a first support portion and a tab formed thereon prior to assembly of the clutch cover assembly, taken along the line V—V in FIG. 4.
Figure 6:
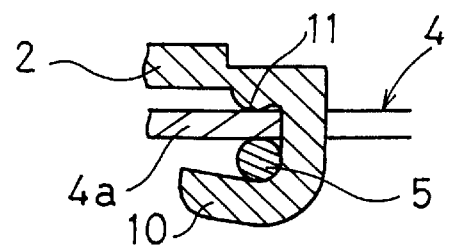
FIG. 6 is a fragmentary cross-sectional view of a portion of the clutch cover depicted in FIGS. 3 and 4, showing the tab after assembly of the clutch cover assembly.

The assembling operation of the clutch cover assembly 1 will now be described. The clutch cover 2 is shown in various stages of assembly in FIGS. 3 to 5. For instance, as shown in FIG. 3, before assembly, the tab 10 extends in an axial direction. It should be noted that the first embossed portions 11 and the second embossed portions 12 are formed on the clutch cover 2 prior to assembly. The diaphragm spring 4 is inserted into the clutch cover 2 along with the wire ring 5 from the engine side of the clutch cover 2. As the diaphragm spring 4 is inserted into the cover,2, the tab 10 penetrate the oblong hole 4c of the diaphragm spring 4. Thereafter, the wire ring 5 is inserted such that the wire ring 5 is fitted onto the outer peripheral sides of the tabs 10. Next, force F shown in FIG. 5 is applied to the tabs 10 such that the tabs 10 are bent to wrap around the wire ring 5 and the diaphragm spring 4, as shown in FIG. 6. The pressure plate 3 is then installed into the clutch cover 2 and the strap plates 6 are fixed to the pressure plate 3 and the clutch cover 2.

In the clutch cover assembly 1, the annular resilient portion 4a applies a biasing force to the pressure plate 3 in a clutch engagement state where a release unit (not shown) is not applying a counter force to the tip of the lever portion 4b of the diaphragm spring 4. As a result, the frictional facing 51 is abutted against the flywheel 50, thereby transmitting a torque to the clutch disc assembly.

When the release unit (not shown) is caused to apply a counter force or clutch releasing force against the tip of the lever portion 4b of diaphragm spring 4 toward the flywheel 50, the annular resilient portion 4a is pulled away from the pressure plate 3. Consequently, the strap plates 6 urge the pressure plate 3 apart from the frictional facing 51. As a result, the frictional facing 51 is separated from the flywheel 50, thereby interrupting the transmission of a torque through the clutch disc assembly 1.

Figure 7:
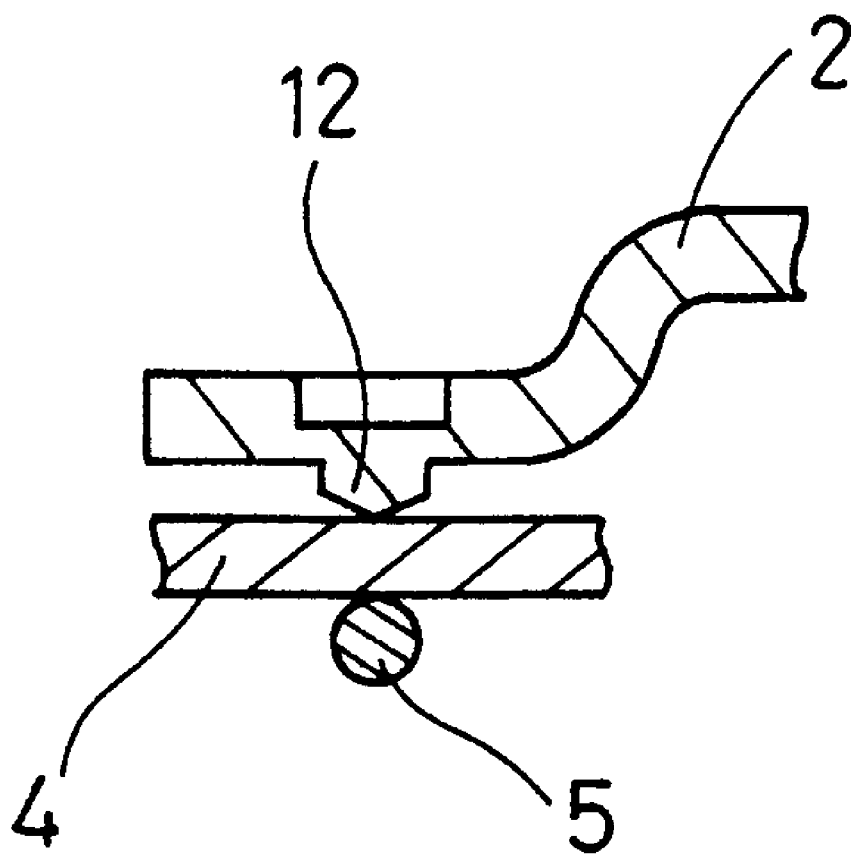
FIG. 7 is a fragmentary cross-sectional view of a portion of the clutch cover depicted in FIGS. 1, 3 and 4, showing a second support portion formed thereon.

In the above-described clutch engaging and disengaging operation, the annular resilient portion 4a is repeatedly elastically deformed about the first and second embossed portions 11, 12 and the wire ring 5, where the first and second embossed portions 11, 12 and the wire ring 5 act as fulcrums, as is apparent from FIGS. 1, 6 and 7. In other words, the inner peripheral portion of the annular resilient portion 4a pivots about the first and second embossed portions 11, 12 and the wire ring 5.

In embodiment of the present invention described above, the first embossed portions 11 are formed by embossing the areas which define the first embossed portions 11. Further, the tabs 10 work-hardened in the bending process which forms the final shape of the tabs 10, thereby further enhancing the hardness. As a result, the possible wear of the first embossed portion 11 is reduced.

Also, because the annular resilient portion 4a is supported by both a plurality of first and second embossed portions 11 and 12, the force exerted on the first and second embossed portions 11 and 12 is divided evenly therebetween thereby lowering the force that would otherwise be exerted a clutch cover having only one type of embossed portion and thereby reducing possible wear.

It should be noted that gaps are defined circumferentially between the first embossed portions 11 and the second embossed portions 12. Dust particles and other debris such as powder produced, for example, by the wear of clutch disc assembly during usage is able to pass through these gaps. The dust may further be exhausted to the radial exterior of the clutch cover assembly 1 through holes 2b and 2c (FIG. 1) formed in the clutch cover 2.

In prior art clutch cover assemblies, there typically two wire rings employed, one on either axial side of the diaphragm spring. In the present invention, only one wire ring 5 is necessary. The omission of one wire ring helps to reduce the overall cost of the parts of the clutch assembly 1, as compared to the prior art. Further, elimination of one wire ring makes the assembling process simpler, and production costs are likewise reduced.

As was described above, in the clutch cover assembly according to the present invention, one wire ring is omitted, and instead the first support portions abut against the inner peripheral portion of the annular resilient portion formed on the clutch cover. Also, because the plurality of tabs are bent in the vicinity of the first support portions, the hardness of the first support portions is increased by work hardening. This makes the first support portions less likely to prematurely wear.

The diaphragm spring is supported by the first and second support portions with the results that the surface pressure of each part is lowered to reduce possible wear. Further, the gap defined circumferentially between the respective first and second support portions makes it possible for the exhausting of debris such as worn powders of, for example, the clutch disc, toward the outer peripheral side of the clutch cover.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A clutch cover assembly, comprising:
    a clutch cover having a radially outer portion configured for attachment to a flywheel, said clutch cover formed proximate an inner radial portion with a plurality of first support portions that are formed at circumferentially spaced apart positions on said clutch cover by press working so as to protrude toward a flywheel side of said clutch cover,
    said clutch cover formed with a plurality of tabs which extend toward the flywheel side from adjacent to said first support portions, said tabs being positioned between said first support portions with respect to a circumferential direction relative to said clutch cover,
    said clutch cover further formed with a plurality of second support portions, said second support portions being formed with said tabs proximate the inner radial portion of said clutch cover between said first support portions, said second support portions formed so as to protrude toward the flywheel side by press working, and
    wherein said first support portions and said second support portions are circumferentially aligned about a radius defined with respect to a central axis of said clutch cover, and said first and second support portions protrude toward the flywheel side such that an axially outermost portion of said first and second support portions define a common plane perpendicular to said central axis, and a portion of said tabs extend in an axial direction toward the flywheel immediately adjacent to said second support portions.

2. The clutch cover assembly as set forth in claim 1 wherein said second support portions and a portion of said tabs are axially offset from the inner radial portion of said clutch cover on an axial side opposite from the flywheel side.

3. A clutch cover assembly, comprising:

a clutch cover having a radially outer portion configured for attachment to a flywheel, said clutch cover formed proximate an inner radial portion with a plurality of first support portions that are formed at circumferentially spaced apart positions on said clutch cover by press working so as to protrude toward a flywheel side of said clutch cover, said clutch cover formed with a plurality of tabs which extend toward the flywheel side from adjacent to said first support portions, said tabs configured to engage and support a diaphragm spring and a wire ring, said first support portions and the wire ring serving as fulcrums for the diaphragm spring, said tabs being positioned between said first support portions with respect to a circumferential direction relative to said clutch cover, said clutch cover further formed with a plurality of second support portions, said second support portions being formed with said tabs proximate the inner radial portion of said clutch cover between said first support portions, said second support portions formed so as to protrude toward the flywheel side by press working, and wherein said first support potions and said second support portions are circumferentially aligned about a radius defined with respect to a central axis of said clutch cover, and said first and second support portions protrude toward the flywheel side such that an axially outermost portion of said first and second support portions define a common plane perpendicular to said central axis, and a portion of said tabs extend in an axial direction toward the flywheel immediately adjacent to said second support portions for engagement with a corresponding surface axially extending surface formed on the diaphragm spring.

4. The clutch cover assembly, as set forth in claim 3, further comprising a pressure plate disposed within said clutch cover having a friction face facing the flywheel.

5. The clutch cover assembly, as set forth in claim 4, wherein the diaphragm spring includes an annular resilient portion engaged between said pressure plate and said first support portions where an outer peripheral portion thereof abuts against said pressure plate and an inner peripheral portion thereof abuts against said first support portions, the diaphragm spring further formed with a plurality of lever portions that extend radially inwardly from said annular resilient portion.

6. The clutch cover assembly, as set forth in claim 5, wherein a distal portion of each of said tabs further extends radially outward confining said wire ring and said diaphragm spring against axial movement between said distal portions of said tabs and said first support portions.

7. The clutch cover assembly as set forth in claim 3 wherein said second support portions and a portion of said tabs are axially offset from the inner radial portion of said clutch cover on an axial side opposite from the flywheel side.

\* \* \* \* \*